United States Patent [19]

Bartholow et al.

[11] Patent Number: 5,221,880

[45] Date of Patent: Jun. 22, 1993

[54] UNDERGROUND TROLLEY VEHICLE WITH BRUSHLESS D.C. MOTOR

[75] Inventors: Jess Bartholow; Michael L. Bartholow, both of Blairsville, Pa.

[73] Assignee: Balco, Inc., Blairsville, Pa.

[21] Appl. No.: 961,400

[22] Filed: Oct. 15, 1992

[51] Int. Cl.⁵ .......................... H02P 6/02; H02P 1/18
[52] U.S. Cl. .................................... 318/139; 318/254; 318/53
[58] Field of Search ............... 318/138, 139, 254, 439, 318/372, 41, 45, 53, 77, 99, 112; 104/96, 98, 287, 288

[56] References Cited

U.S. PATENT DOCUMENTS

| | | |
|---|---|---|
| 3,596,154 | 7/1971 | Gurwicz et al. |
| 3,688,169 | 8/1972 | Yamaya et al. ..................... 318/138 |
| 3,760,246 | 9/1973 | Gurwicz et al. |
| 3,815,001 | 6/1974 | Jamieson ............................ 318/139 |
| 4,061,089 | 12/1977 | Sawyer .............................. 310/12 X |
| 4,369,383 | 1/1983 | Langley ............................... 310/12 |
| 4,920,475 | 4/1990 | Rippel ................................. 363/132 |
| 5,170,352 | 12/1992 | McTamaney et al. .......... 364/424.02 |

OTHER PUBLICATIONS

Feasibility of Remote Control and Development of Remote Control Devices and Sensors. 7. Feasibility Study of the Application of Solid State Motor Controller to Underground Mining Machines, Oct. 1972, pp. 1-72.
Powertec Torque Controller Option Board, Jul. 10, 1990, pp. 1-9.
Powertec Model 1000RG and 1000RGA Instruction Manual Jul. 20, 1990, pp. 1-44.
Powertec Brushless D.C. Motor Manual, Mar. 31, 1992, pp. 1-9.

*Primary Examiner*—Bentsu Ro
*Attorney, Agent, or Firm*—Kirkpatrick & Lockhart

[57] ABSTRACT

An underground mining vehicle has a solid state electronic motor controller for controlling the operation of a brushless D.C. motor. A switching network is connected between a high voltage bus and portions of a stator winding for delivering current to portions of the stator winding. A first transducer produces a first group of feedback signals representative of the position and speed of the rotor. A second transducer produces a second group of feedback signals representative of the current delivered to the motor. A speed control is provided which produces an input signal representative of the desired speed of the vehicle. An electronic circuit, responsive to the input signal, the first group of feedback signals, and the second group of feedback signals, produces control signals. The control signals are input to the switching network to control the application of current to the portions of the stator winding. The control signals cause the vehicle to travel at the desired speed and cause the motor to produce constant torque.

5 Claims, 6 Drawing Sheets

UNDERGROUND TROLLEY VEHICLE WITH BRUSHLESS D.C. MOTOR

BACKGROUND OF THE INVENTION

1. Field of the Invention

The present invention is directed generally to underground trolley vehicles of the type used in mining applications and more particularly to such vehicles propelled by D.C. motors.

2. Description of the Background of the Invention

A variety of vehicles are used in underground mining. Many of the vehicles are of the type which are used in conjunction with a trolley system. A trolley system for an underground mine, for example a coal mine, is comprised of an overhead, high voltage, D.C., noninsulated conductor which runs along the roof of the mine. A pair of parallel rails runs along the floor of the mine. The rails are at ground potential such that a load can be connected between the high voltage conductor and the rails. Thus, underground trolley systems are based upon the same principles as are above ground trolley systems.

Mining vehicles used in underground trolley systems are typically series wound D.C. motors having brushes. When the vehicle is started from a dead stop, a large resistance is in series with the motor. As speed increases, the large resistance is dropped out, in a stepped manner, so that at full speed all of the resistance is out of the circuit. Such motors and control systems are simple, rugged, and well suited for the harsh environment found in underground mines. There are, however, a number of problems associated with such motors. First, the motor brushes tend to wear out thus necessitating replacement. Although the brushes themselves are not expensive, the brushes are not easily accessible and usually require that the vehicle be taken out of service for at least one shift. In addition, the labor costs associated with brush replacement are high. Furthermore, the large resistance is stepped out through the use of contactors which rely on moving parts and are the source of current arcs as contact is broken. Because of the very nature of such devices, routine maintenance is accepted.

It is known that brush-type D.C. motors are capable of being dynamically braked. For example, if a vehicle is coasting, and control is shut off, the motor acts as a generator and the energy is dissipated into passive resistors. The energy produced and dissipated is proportional to the speed of the rotor. Thus, as the rotor slows down, the braking force is reduced, and the dynamic braking becomes less effective. Less effective braking means greater distances needed to stop the vehicle.

It is desirable to replace the bush-type D.C. motors with brushless D.C. motors thereby eliminating the downtime and maintenance associated with replacement of the motor brushes. It is also desirable to replace the contactors and relays with solid state electronics. It is further desirable to replace brush-type D.C. motors with brushless D.C. motors capable of regenerative braking which is independent of the speed of the rotor. However, the application of brushless D.C. motors to underground trolley applications has met with a number of problems.

An underground trolley system is typically operated on high voltage D.C. such as 240 volts. Power is drawn from the overhead conductor by use of a trolley pole. The contact between the trolley pole and the high voltage conductor is not continuous as the vehicle moves along the rails. For example, uneven rails may cause the trolley pole to bounce or otherwise lose contact with the high voltage conductor. When the vehicle passes over a switch, the application of power from the overhead conductor may be interrupted. Similarly, loss of the electrical ground, caused by dirt, debris, or generally poor contact between the vehicle's wheels and the rails, may also cause an interruption in the application of power from the overhead conductor.

Even when contact between the trolley pole and the overhead conductor is good, and the ground connection is good, the power available from the overhead conductor is very noisy and full of voltage spikes as a result of other equipment operating on the system. It has been reported that a 300 volt D.C. line can fluctuate between 180 volts and 370 volts thus representing a variation of $-40$ and $+25$ percent, respectively. Switching transients due to electromechanical contactors switching off inductive motor loads are reported to be approximately 1500-2000 volts on a 300 volt line and lasting from two or three to several hundred microseconds. Lastly, lightening strikes result in surge voltages of about five times nominal line voltage and last for approximately fifty microseconds. The combination of interruptions in the application of power coupled with a noisy power source having large voltage spikes is not conducive to the use of solid state electronics.

In addition to power supply problems, the mine environment itself is extremely harsh. The relative humidity can be as high as 98 percent. Dust concentrations are typically 3 mg per cubic meter but may be a high as 10 mg per cubic meter Additionally, the vehicles are subjected to constant and substantial vibrations. The combination of humidity, dirt, and vibration is a substantial impediment to the implementation of solid state electronic drive systems.

During the 1970's there was substantial interest in using silicon controlled rectifiers (SCR) in solid state D.C. motor controllers for underground mining machines. The harsh environment, however, posed an unexpected problem. Due to the presence of methane, the SCR's had to be placed in explosion proof housings. At that time, all existing commercial SCR motor controllers used direct convection type cooling which was incompatible with the explosion proof housings. To overcome that cooling problem would have required substantial and expensive changes in machine design. Thus, the need still exists for a solid state D.C. motor controller which can be used on existing machines.

BRIEF DESCRIPTION OF THE PRESENT INVENTION

A mining vehicle for use on a high voltage, D.C. trolley system of the type having an overhead high voltage conductor and a pair of parallel rails at ground potential is comprised of a vehicle frame. A plurality of flanged wheels are positioned under the frame and connected thereto so as to ride along the parallel rails of the trolley system. The vehicle frame carries the following components. A brushless D.C. motor having a rotor and a stator. The rotor carries magnets for generating a field flux. The stator has a plurality of winding portions, each portion capable of generating magnetic flux. A gear box is provided for mechanically coupling the rotary motion of the rotor to the plurality of wheels. A high voltage bus is provided. A mechanism, typically a trolley pole and associated components, is provided for contacting the high voltage conductor of the trolley system and for connecting that high voltage conductor to the high voltage bus. A switching network is connected between the high voltage bus and portions of the stator winding for delivering current to portions of the stator winding.

A first transducer produces a first group of feedback signals representative of the position and speed of the rotor. A second transducer produces a second group of feedback signals representative of the current delivered to the motor. A speed control is provided which produces an input signal representative of the desired speed of the vehicle. An electronic circuit, responsive to the input signal, the first group of feedback signals, and the second group of feedback signals, produces control signals. The control signals are input to the switching network to control the application of current to the portions of the stator winding. The control signals cause the vehicle to travel at the desired speed and cause the motor to produce constant torque.

A capacitor bank is connected across the high voltage bus. A first resistor is connected between the capacitor bank and ground potential for discharging the capacitor bank when the connection mechanism loses contact with the high voltage conductor of the D.C. trolley system. A resistor bank is provided. A detector is connected to the high voltage bus for connecting the bus to the resistor bank in the event of an over-voltage condition on the bus. Finally, the vehicle is provided with brakes for mechanically bringing the vehicle to a safe stop.

The vehicle of the present invention represents a substantial advance over the art. First, by using a brushless motor, the expense and downtime associated with brush replacement is eliminated. Second, by replacing the contactors and resistor banks with solid state electronics, problems associated with the contactors are eliminated. The use of a solid state drive system, having feedback signals which constantly monitor the speed of the vehicle and torque produced by the motor, allows for very precise control of the vehicle. The control signals, which are low voltage signals, are produced in an environment which is substantially immune to the problems associated with the high voltage conductor of the trolley system. Those control signals are input to a switching network typically comprised of high voltage transistors which efficiently conduct current from the high voltage bus to the various portions of the stator winding. The use of brushless D.C. motors enables the use of regenerative braking, which is independent of the speed of the rotor. Thus, unlike dynamic breaking, regenerative braking can be used to bring the vehicle to a complete stop. Those, and other advantages and benefits of the present invention, will be apparent from the Description Of A Preferred Embodiment hereinbelow.

BRIEF DESCRIPTION OF THE DRAWINGS

For the present invention to be readily understood and easily practiced, the present invention will be described, for purposes of illustration only, in conjunction with the following figures wherein.

DESCRIPTION OF A PREFERRED EMBODIMENT

Figure 1:
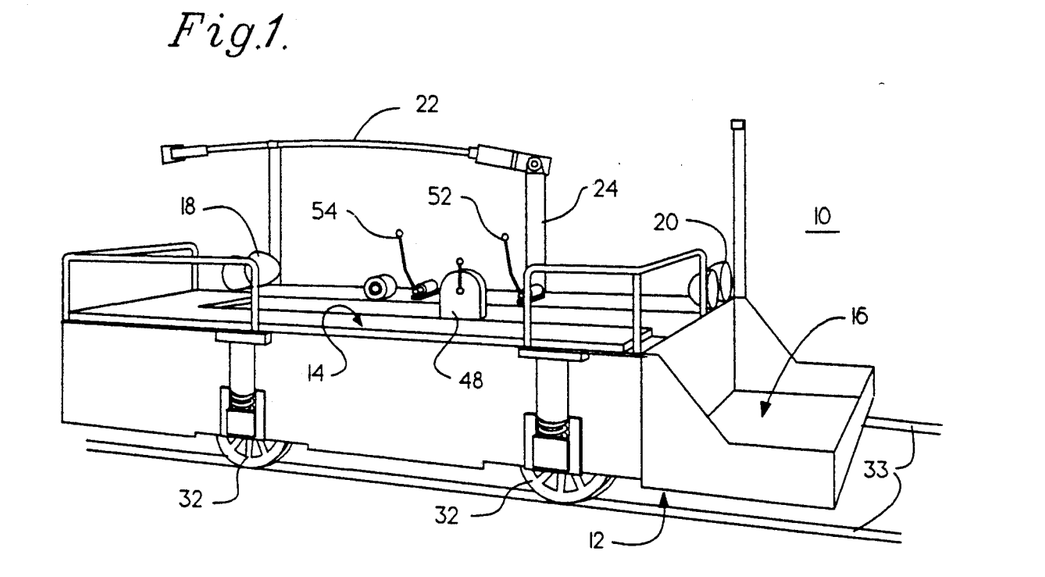
FIG. 1 is a perspective view of an underground trolley vehicle.
Figure 2:
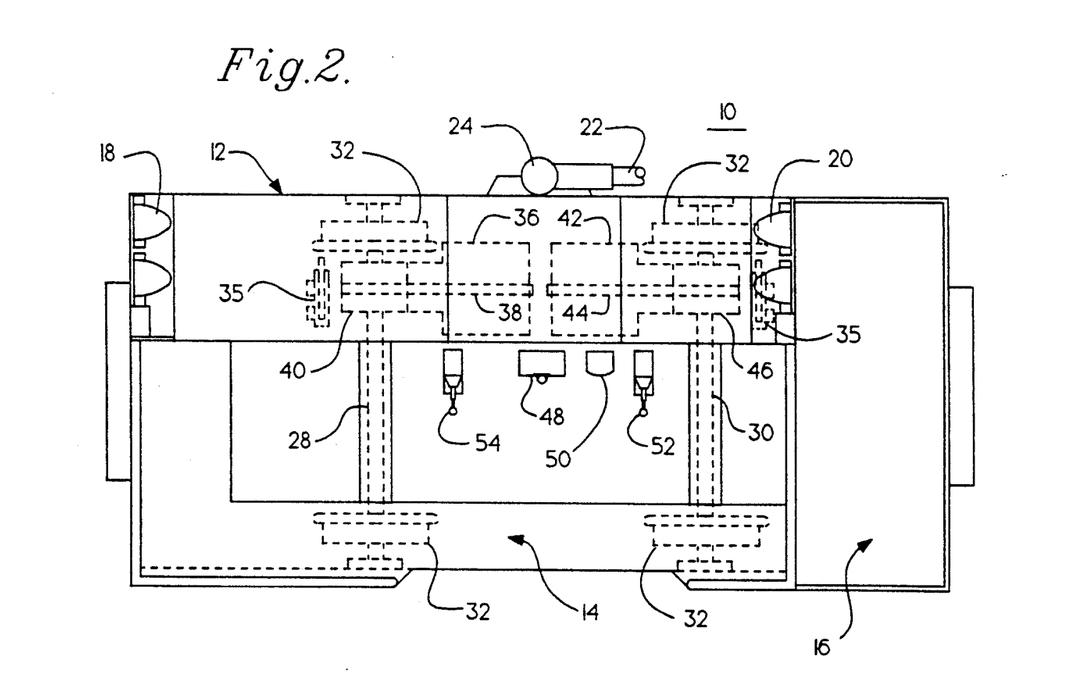
FIG. 2 is a top view of the trolley vehicle of FIG. 1.

FIGS. 1 and 2 illustrate one type of underground trolley present invention will be described in terms of the vehicle 10, it is understood that the present invention may be applied to all types of underground trolley vehicles. The vehicle 10 is conventional in terms of its mechanical construction and thus only a general description of the mechanical construction is necessary.

The vehicle 10 is comprised of a frame 12 having a seat portion 14 for passengers and a platform 16 for heavy equipment. The vehicle 10 has a first pair of headlights 18 facing in one direction and a second pair of headlights 20 facing in the opposite direction. The vehicle 10 is provided with a trolley pole 22 which is pivotally mounted on an upright 24. Such pivotal mounting allows trolley pole 22 to be pulled along behind the vehicle 10, regardless of the vehicle's 10 direction of travel.

The frame 12 carries a first journaled axle 28 and a second journaled axle 30. Each of the first and second journaled axles, 28 and 30, respectively, has a pair of flanged wheels 32 positioned on opposite ends thereof. The flanged wheels 32 are carried by axles 28 and 30 so as to be positioned under the frame 12. The frame 12 is thus supported by the wheels 32 above the floor of the mine so that rotation of the wheels 32 causes the vehicle 10 to be propelled. Because of the flanges on the wheels 32, the vehicle is constrained to roll along parallel rails 33 of the trolley system. One of the wheels 32 carried by the first axle 28 and one of the wheels 32 carried by the second axle 30 may be provided with hydraulic brakes 35 in a conventional manner.

The frame 12 carries a first motor 36 having a first rotor 38. The rotary motion of the rotor 38 is coupled to the first axle 28 through a gear box 40, or other similar mechanism. The frame 12 also carries a second motor 42 having a second rotor 44. The rotary motion of the second rotor 44 is coupled to the second journaled axle 30 through a gear box 46.

The vehicle 10 is provided with a number of controls. An accelerator 48 is provided for setting the speed and direction of travel of the vehicle 10. The vehicle 10 is also provided with a dead man switch 50. Finally, the vehicle 10 is provided with a service brake control 52 for operating the hydraulic brakes 35 and a parking and emergency brake control 54 for operating the emergency brake (not shown). As previously stated, the mechanical aspects of vehicle 10, i.e., the journal axles 28 and 30, gear boxes 40 and 46 for imparting rotary motion to journaled axles 28 and 30, respectively, hydraulic brakes 35, dead man switch 50, etc. are all of common and well known construction such that a detailed description of same is not required.

An important feature of the present invention is the provision of brushless D.C. motors for motors 36 and 42. With the provision of brushless D.C. motors, the resistor bank normally associated with trolley vehicles of this type is eliminated. Also eliminated are the contactors or relays used to switch out, in a stepped fashion, individual resistors making up the resistor bank. In their place, there is provided various solid state electronics which are described in greater detail in FIG. 3.

Figure 3:
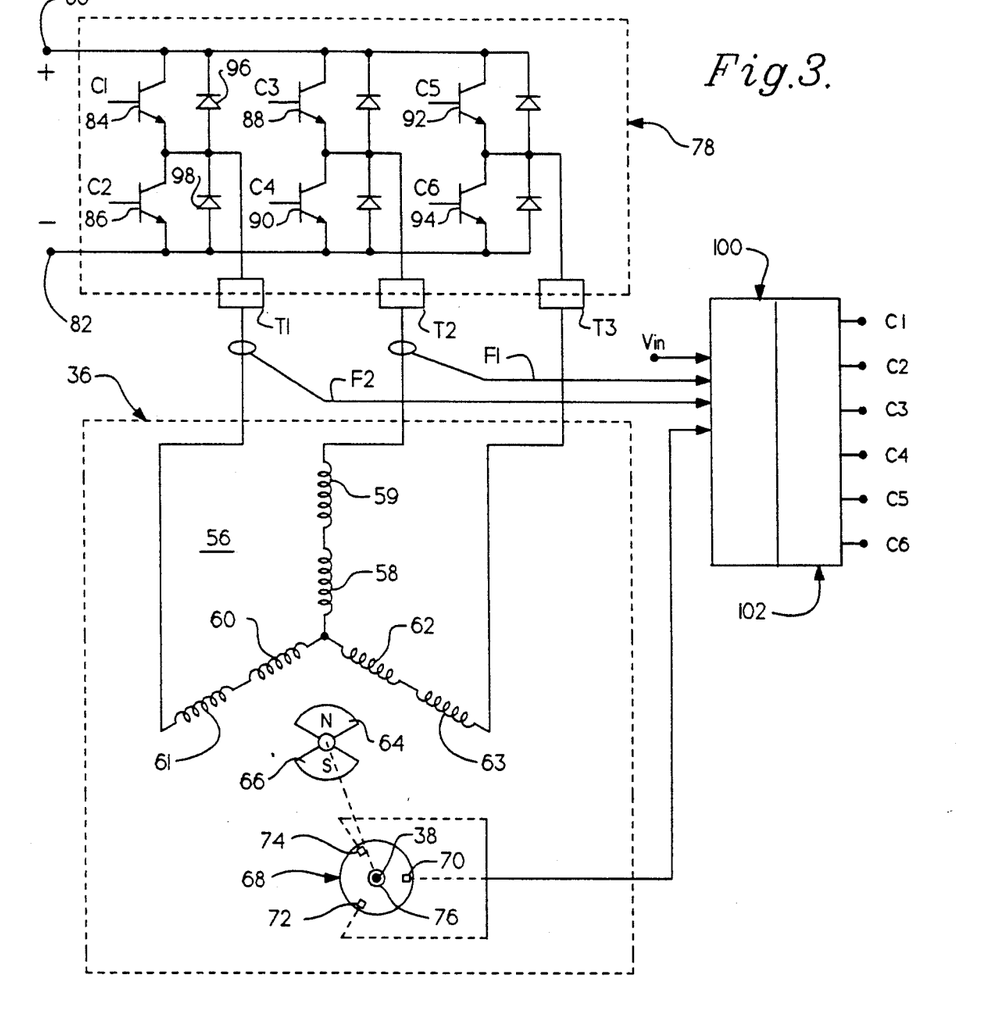
FIG. 3 is a high level diagram of a control system for a brushless D.C. motor constructed according to the teachings of the present invention.

FIG. 3 is a high level diagram of the electronics needed to provide power to the brushless D.C. motor 36 according to the teachings of the present invention. The brushless D.C. motor 36 has a stator winding 56 comprised of first, series connected winding portions 58 and 59, second, series connected winding portions 60 and 61, and third, series connected winding portions 62 and 63. The first winding portions 58 and 59, second winding portions 60 and 61, and third winding portions 62 and 63 are interconnected in a Wye configuration. Other types of winding configurations are known and the present invention is not limited to any particular stator winding configuration. The rotor 38 carries a pair of pole pieces 64 and 66. The pole pieces 64 and 66 provide a magnetic flux, commonly referred to as the field flux. Although the motor 36 is shown as having two poles, brushless D.C. motors are available with four or eight poles.

The motor 36 is also provided with a coding mechanism 68 which is positioned about rotor 38. Coding mechanism 68 may be provided with various sensors, such as hall effect sensors 70, 72, and 74. The hall effect sensors 70, 72, and 74 produce an output signal whenever a magnet 76, carried by rotor 38, rotates past one of the sensors. Because the magnet 76 rotates in unison with the rotor 38, the pulses produced by sensors 70, 72, and 74 can be used to identify the position of the rotor 38. Additional sensors can be used to provide indications of rotor speed and direction, if required. Such information is needed to insure that power is supplied to the appropriate winding portions 58–63, inclusive, depending upon the position of pole pieces 64 and 66.

Current is provided to the stator winding 56 through a switching module 78. The switching module 78 has a first input terminal 80 and a second input terminal 82 connected across a high voltage supply bus, comprised of conductors 159 and 160 shown in FIG. 7. The switching module 78 has a first output terminal T1 connected to the series windings 61 and 60, a second output terminal T2 connected to the series windings 59 and 58, and a third output terminal T3 connected to the series windings 63 and 62. Thus, the switching module 78 is connected between the high voltage supply bus and the motor 36.

Switching module 78 is comprised of six transistors 84, 86, 88, 90, 92, and 94. The transistors are connected in pairs. A collector terminal of transistor 84 is connected to the input terminal 80 while an emitter terminal of transistor 84 is connected to a collector terminal of transistor 86. An emitter terminal of transistor 86 is connected to the input terminal 82. A base terminal of the transistor 84 is responsive to a first control signal C1. A base terminal of the second transistor 86 is responsive to a second control signal C2. A diode 96, sometimes referred to as a commutation diode or freewheeling diode, is connected across the collector and emitter terminals of the transistor 84. A diode 98 is similarly connected across the collector and emitter terminals of the transistor 86. The output terminal T1 is electrically connected to the junction between the emitter terminal of transistor 84 and the collector terminal of transistor 86.

Transistors 88 and 90 are connected in a similar fashion. A base terminal of the transistor 88 is responsive to a third control signal C3 while a base terminal of the transistor 90 is responsive to a fourth control signal C4. The second output terminal T2 is electrically connected to the junction between an emitter terminal of the transistor 88 and a collector terminal of the transistor 90.

Transistors 92 and 94 are connected in a like manner. A base terminal of transistor 92 is responsive to a fifth control signal C5 while a base terminal of the transistor 94 is responsive to a sixth control signal C6. The output terminal T3 is connected to the junction between an emitter terminal of the transistor 92 and a collector terminal of the transistor 94. The operation of the switching module 78 is described in conjunction with FIGS. 4 and 5.

Figure 4:
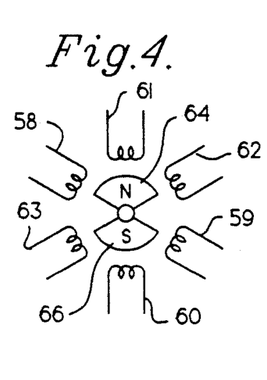
FIG. 4 is a diagram representing the relation between the pole pieces carried by the rotor and the stator winding portions.
Figure 5:
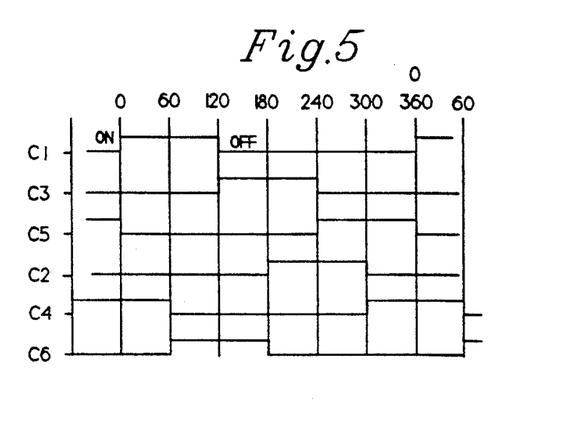
FIG. 5 is a timing diagram illustrating the relationships among the control signals used to operate the switching module.

In FIG. 4, the pole pieces 64 and 66 carried by rotor 38 are illustrated in conjunction with stator winding portions 58 through 63, inclusive. FIG. 5 is a timing diagram illustrating each of the control signals C1 through C6, inclusive. Assuming that the rotor 38 has the position shown in FIG. 4, then the first control signal C1 and the fourth control signal are high thus rendering transistors 84 and 90, respectively, conductive. With transistors 84 and 90 conductive, winding portions 61, 60, 58, and 59 are energized. The energization of those winding portions creates electric fields which interact with the field flux. With winding portion 61 forming a north pole and winding portion 60 forming a south pole, and winding portion 58 forming a north pole while winding portion 59 forms a south pole, the stator will be caused to rotate clockwise approximately sixty degrees. After sixty degrees of rotation, as seen in FIG. 5, transistor 84 remains on, i.e., the first control signal C1 stays high, transistor 90 is turned off, i.e., the fourth control signal C4 goes low, and transistor 94 is turned on, i.e., the sixth control signal C6 goes high. With transistors 84 and 94 conductive, a different combination of stator winding portions is energized, thus changing the position of the north and south poles formed by the stator. Those new north and south poles interact with the field flux causing another 60 degrees of rotation of the rotor. Thereafter, the control signals C1 through C6 are produced according to the timing diagram in FIG. 5 to produce a full 360 degree rotation of rotor 38.

It is known that the power delivered to the motor 36 can be varied by modulating the width of the control signals. For example, during rotation of the rotor from zero to sixty degrees, if transistor 84 is left on constantly and transistor 90 is turned on and off, the power delivered to the motor 36 can be varied. The greater the width of the pulse turning on transistor 90, the more power delivered to the motor 36.

Completing the description of the circuit shown in FIG. 3, control electronics 100 receives the input signals produced by coding mechanism 68. Coding mechanism 68 provides signals representative of the rotor 38 relative to the stator winding portions 58 through 63, inclusive. Other types of coding mechanisms may be used which provide signals representative of the speed and direction of rotation of rotor 38. Control electronics 100 also receives feedback signals F1 and F2 representative of the current drawn by motor 36. Control electronics 100 also receives an input signal Vin which is representative of the desired speed of the vehicle 10. Input signal Vin is typically produced by the accelerator 48 seen in FIG. 1.

Control electronics 100 is typically comprised of two sections, control circuitry and commutation circuitry (not shown). The control circuitry comprises user interface and housekeeping circuits. The control circuitry governs the speed of the motor and, depending on the application, direction and torque. The commutation circuitry converts the signals generated by the coding mechanism 68 into a form suitable for use by the control circuitry to generate control signals C1 through C6, inclusive. Control electronics 100 operates in conjunction with a drive circuit 102. Drive circuit 102 provides the interface between the low voltage control electronics 100 and the high voltage switching module 78. Various types of control electronics 100 and drive circuits 102 are known. The reader requiring more details is referred to *Brushless D.C. Motors Electronic Commutation And Controls* by Thomas J. Sokira and Wolfgang Jaffe, particularly Chapter 6.

Figure 6A:
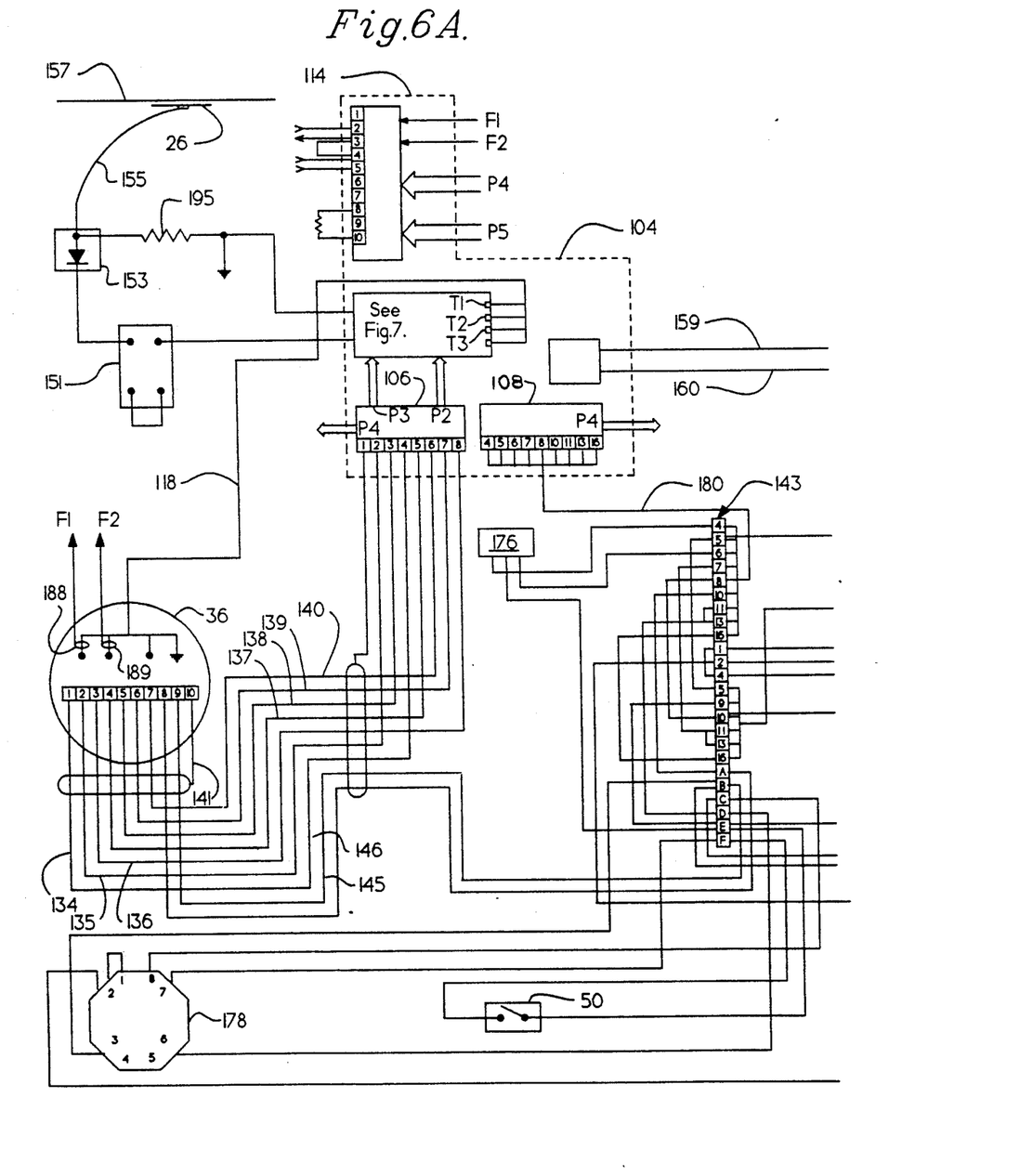
FIGS. 6A, 6B, and 7 are detailed diagrams illustrating one embodiment for implementing the high level diagram of FIG. 3.
Figure 6B:
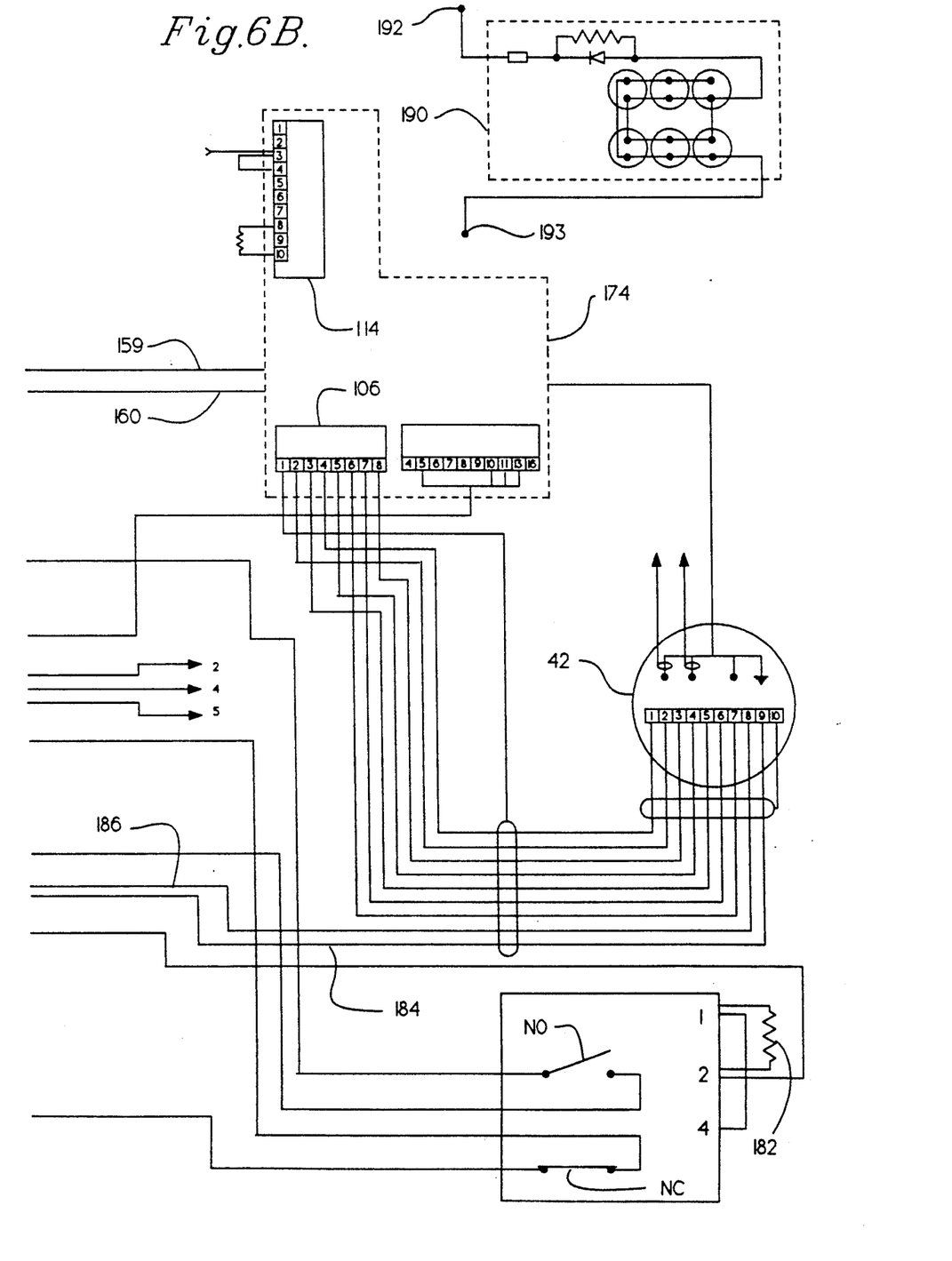
Figure 7:
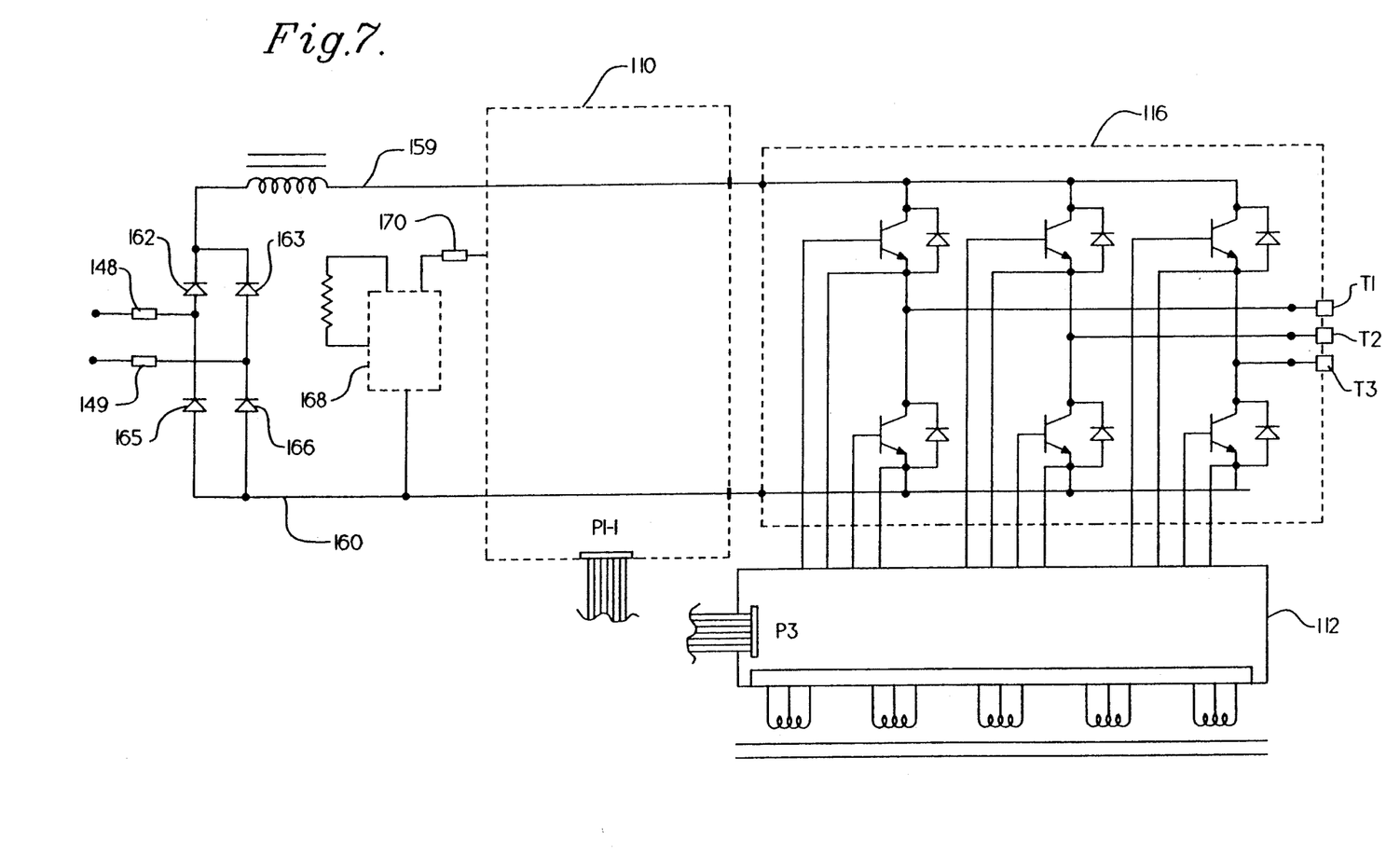

A preferred embodiment for implementing the circuit of FIG. 3 will now be disclosed in conjunction with FIGS. 6A, 6B, and 7. The embodiment disclosed in conjunction with FIGS. 6 and 7 is assembled using a number of commercial components available from PowerTec Industrial Corporation of Rockhill, S.C. In FIG. 6, a first chassis 104 carries a current controller board 106, model D141-108.4, a speed controller board 108, model D147-101, a capacitor board 110 (seen in FIG. 7), model 141-106, and a base driver board 112 (seen in FIG. 7), model 141-105. Chassis 104 also carries a torque board 114, model B148-101. The boards 106, 108, 110, 112, and 114 have various common connections (not shown) by virtue of being carried by the same chassis 104, such as low voltage (+24, −24) power supply connections, ground connections, etc. Additional connections between the boards are as follows. A multiple pin connector P4 from the current controller board 106 is connected to a multiple pin connector P5 of torque board 114. A multiple pin connector P4 from speed controller board 108 is connected to pin connector P4 of torque board 114. A multiple pin connector P3 from current controller board 106 is connected to a multiple pin connector P1-1 of capacitor board 110. A multiple pin connector P2 from the current controller board 108 is connected to a multiple pin connector P3 of base driver board 112.

The chassis 104 also carries a switching module 116, seen in FIG. 7. The switching module 116 carries output terminals T1, T2, and T3. The switching module 116 is analogous in construction and operation to the switching module 78 discussed in conjunction with FIG. 3. The output terminals T1, T2, and T3, together with a ground terminal are connected to motor 36 through a grounded multiple conductor cable 118. Motor 36 may, for example, be a seventy-five horsepower, brushless D.C. motor available from PowerTec Industrial Corporation.

Figure 8:
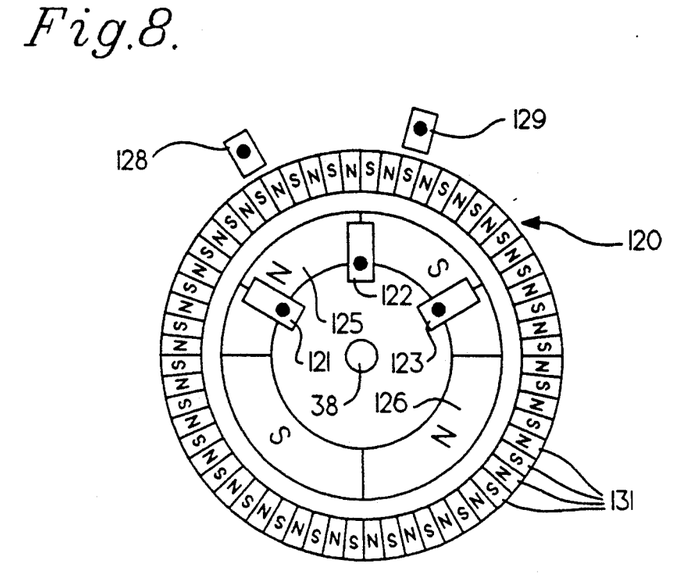
FIG. 8 illustrates a coding wheel which provides a first group of feedback signals representative of the position, speed, and direction of rotation of the motor's rotor.
Figure 9:
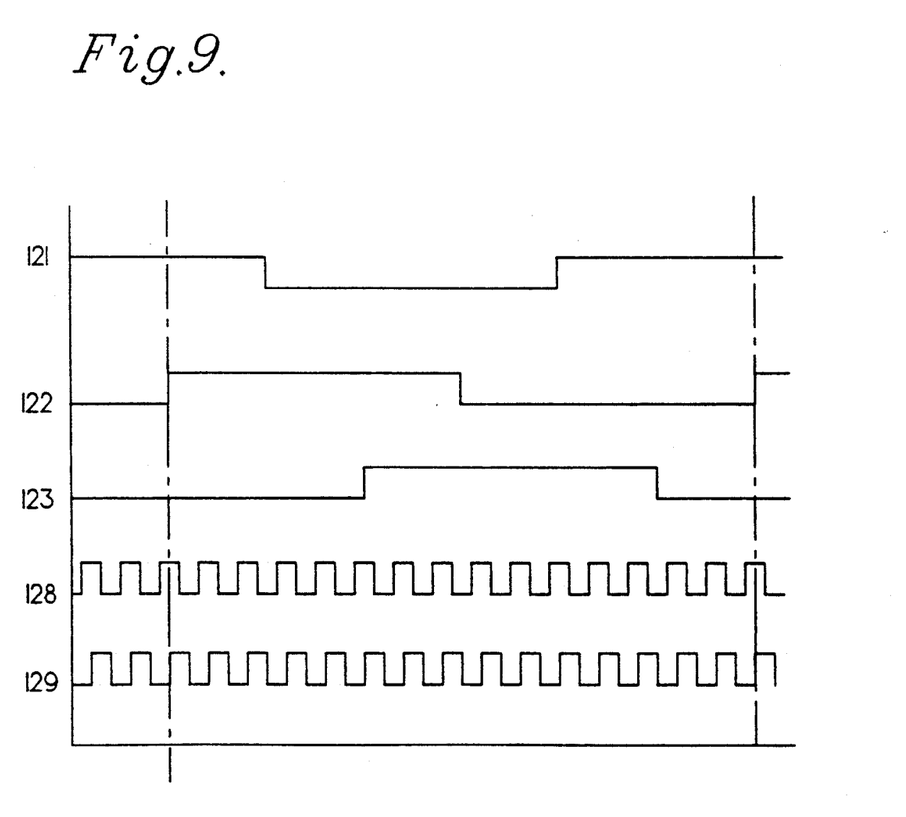
FIG. 9 is a timing diagram illustrating the signals produced by the coding wheel of FIG. 8.

The PowerTec brushless D.C. motors are provided with a coder 120 of the type shown in FIG. 8. The coder 120 is comprised of 3 hall effect sensors 121, 122, and 123, each of which is responsive to the position of the rotor 38, which carries large permanent magnets 125 and 126. The coder 120 also carries hall effect sensors 128 and 129 which are responsive to a plurality of smaller magnets 131. The signals produced by hall effect sensors 121, 122, 123, 128, and 129 are illustrated in FIG. 9. The portion of the timing diagram of FIG. 8 between the dotted lines represents one-half of one revolution of a four pole motor. The coder 120 thus carries a first group of transducers which produces a first group of feedback signals representative of the position, speed, and direction of rotation of rotor 38.

The signals illustrated in FIG. 9 produced by the hall effect sensors of the coder 120 are input to the current controller board 106 as follows. Motor terminal number 1, at which the signal produced by hall effect sensor 122 is available, is connected to terminal number 4 of current controller board 106 through a conductor 134. Motor terminal number 2, at which the output signal of hall effect sensor 121 is available, is connected to terminal number 2 of current controller board 106 through a conductor 135. Motor terminal number 3 receives a five volt signal from terminal 8 of current controller board 106 through a conductor 136. The five volt signal is input to the hall effect sensors in a known manner. Motor terminal number 4, at which the output signal of hall effect sensor 129 is available, is connected to terminal number 5 of the current controller board 106 through a conductor 137. Motor terminal number 5, at which the output signal of hall effect sensor 123 is available, is connected to terminal number 3 of current controller board 106 through a conductor 138. Motor terminal number 6 is a common terminal connected to common terminal 7 of the current controller board 106 through a conductor 139. Motor terminal 7, at which the output signal produced by hall effect sensor 128 is available is connected to terminal number 6 of the current controller board 106 through a conductor 140. Motor terminals 8 and 9 are connected to terminals A and B, respectively, of a terminal strip 143 through conductors 145 and 146, respectively. Lastly, terminal 10 of motor 36 is a grounding terminal at which a shield may be connected. Similarly, terminal 1 of current controller board 106 is a grounding terminal where a shield may be connected.

Chassis 104 carries a pair of 50 amp fuses 148 and 149 (see FIG. 7). One of the fuses 148 is electrically connected to a circuit breaker 151. The other fuse 149 is connected to ground. The circuit breaker 151 is connected through a diode 153 to a conductor 155. The conductor 155 extends through upstanding member 24 (FIG. 1) and through the trolley pole 22 and is connected to the shoe 26. The shoe 26 is designed for sliding engagement with the overhead trolley system conductor 157.

A high voltage D.C. power supply bus, comprised of bus conductors 159 and 160, (see FIG. 7) is provided. Bus conductor 159 is connected to fuses 148 and 149 through diodes 162 and 163, respectively. Bus conductor 160 is connected to fuses 148 and 149 through diodes 165 and 166, respectively. Power is provided to bus conductor 159 through shoe 26, which is in sliding contact with the high voltage D.C. conductor 157 of the trolley system, conductor 155, diode 153, circuit breaker 151, fuse 148, and diode 162. Bus conductor 160 is connected to the ground of the trolley system through diode 166 and fuse 149. Thus, the high voltage D.C. power supply bus is electrically connected to high voltage D.C. trolley system.

A conventional power supply (not shown) may be provided to convert the high voltage D.C. available on the high voltage power supply bus into a stable, low voltage used by the various solid state boards carried by chassis 104. For example, the power supply may provide highly filtered, regulated, voltages at plus twenty-four and minus twenty-four volts. In that manner, the solid state boards responsible for the production of the control signals used by switching module 116 are not exposed to the noisy and erratic current flowing into the system on conductor 155.

Completing the description of FIG. 7, a bus loader board 168 is connected between an output terminal of capacitor board 110 through a bus loader fuse 170 and the negative or common bus conductor 160. The function of the bus loader board 168 is to monitor the voltage available across bus conductors 159 and 160. When the motors are operating in the regenerative mode, high voltages may appear across bus conductors 159 and 160. Under such circumstances, a regenerative resistor bank 172 is connected across bus conductors 159 and 160 by bus loader board 168 to dissipate such excess power.

Returning to FIG. 6, the circuit also includes the accelerator 48, a direction control switch 176, the dead man switch 50, and a relay 178. The terminal strip 143 is also used to interconnect the first chassis 104 and a second chassis 174, shown in FIG. 6B. The second chassis 174 is identical in construction and operation as the first chassis 104. For that reason, the second chassis 174 is not shown in detail. The second chassis 174 produces output signals which are output to the second motor 42. The second motor 42 carries a coder 120 which produces the same feedback signals as discussed in conjunction with motor 36. As previously explained, those feedback signals are input to the current controller board 106 carried by the second chassis 174.

Terminal 3 of torque board 114 in the first chassis 104 is connected to terminal 3 of torque board 114 in the second chassis 174 so that the torque board in the second chassis 174 is slaved to the torque board in the first chassis 104. Those or ordinary skill in the art will recognize that the two chassis 104 and 174 could be wired so as to independently operate motors 36 and 42.

The terminal strip 143 has an upper portion comprising terminals 4, 5, 6, 7, 8, 10, 11, 13, and 16. By virtue of a multiple conductor 180, those terminals of the upper portion of the terminal board 143 are connected to terminals 4, 5, 6, 7, 8, 10, 11, 13, and 16 of speed controller board 108. Terminals 4 and 6 of the upper portion of terminal board 143 are connected to direction switch 176. Direction switch 176 is also connected to terminal E, on the bottom portion of terminal strip 143. Terminal 5 of the top portion of terminal strip 143 is connected to terminal 5 of the middle portion of terminal strip 143. Upper terminal 5 also receives a signal from a normally open switch within accelerator 48. Upper terminal 7 is connected to middle terminal 11. Upper terminal 10 is connected to lower terminal A. Upper terminal 11 is connected to upper terminal 13. Upper terminal 13 is also connected to lower terminal D.

Middle terminal 1 is connected to middle terminal 4. Middle terminal 1 also is connected to terminal 2 on torque board 114 of chassis 104. Middle terminal 2 is connected to a potentiometer 182 of accelerator 48. The potentiometer 182 produces an input signal representative of the desired speed of the vehicle. The setting on potentiometer 182 is adjustable by the user. Middle terminal 2 of terminal strip 143 is also connected to terminal 4 of torque 114. Middle terminal 4 is connected to terminal 5 of torque board 114. Middle terminal 9 is connected to lower terminal E. Middle terminal 10 is connected to a normally closed contact in accelerator 48. Lower terminal 11 is connected to lower terminal 13. Middle terminals 5, 9, 10, 11, 13, and 16 are connected to terminals 5, 9, 10, 11, 13, and 16, of speed controller board 108 in chassis 174.

Turning now to the lower portion of terminal strip 143, terminal A is connected to upper terminal 10 and is connected to a thermal switch within motor 36 through a conductor 145 as previously indicated. Terminal B is connected to the thermal switch within motor 36 through a conductor 146. Terminal B is also connected to a thermal switch within motor 42 through a conductor 184. Terminal B is also connected to terminal 3 of the relay 178. The relay 148 may be a 48 volt D.C. relay of the type provided by Potter and Brumfield, model No. KRP11DG. Terminal C is connected to the thermal switch within motor 32 by a conductor 186. Terminal C is also connected to terminal 8 of relay 178. Terminal D is associated to terminal 6 of the relay 178. Terminal E is connected to the bidirectional switch 176 and middle terminal 9 as previously mentioned. Terminal E is also connected to the dead man switch 50. Finally, terminal E is connected to the normally open switch of accelerator 48. Lower terminal F is connected to terminal 7 of the relay 178. Terminal F is also connected to the dead man switch 50. Terminal 2 of relay 178 is connected to the normally closed switch of accelerator 148.

Two of the three conductors from output terminals T1, T2, and T3 are routed through current sensing coils or loops 188 and 189. Current sensing loops 188 and 189 sense the current being provided to portions of the stator winding 56. The thus produced second group of feedback signals F1 and F2 are input to torque board 114.

A resistor 195 connects conductor 155 to ground. During normal operation, the high voltage bus presents a lower resistance than does resistor 195, so most of the current flows into the bus. In the event that shoe 26 loses contact with conductor 157, as when the position of the trolley pole is being reversed to allow the vehicle to travel in the opposite direction, the capacitors serving the high voltage bus are discharged through resistor 195 thereby making the trolley pole safer to handle.

Completing the description of the circuit of FIG. 6, the high voltage bus conductors 159 and 160 are output from the first chassis 104 to the second chassis 174. A capacitor bank 190 has a pair of input terminals 192 and 193 which may be connected across high voltage bus conductors 159 and 160, respectively. The capacitor bank 190 may be provided in the event that the capacitor board 110 illustrated in FIG. 7 does not have sufficient capacitance to satisfy the operational requirements of the system.

In normal operation, the potentiometer 182 of the accelerator 48 is set to the speed desired by the user. Assuming a direction has been selected with direction switch 176, and the user has his or her foot on dead man switch 50, the circuitry carried by chassis 104 will produce control signals which will be input to switching module 116. Switching module 116 will provide current from the high voltage bus conductors 159 and 160 to various portions of the stator winding 56 depending upon the position of the poles carried by the rotor. The rotor will continue to be accelerated until the desired speed, as indicated by the position of potentiometer 182, is reached. The feedback signals F1 and F2 which are input to torque board 114 are used by the circuitry carried by chassis 104 to ensure that the torque produced by the motor is constant. In a similar fashion, chassis 174 controls motor 42. In the event that the thermal switch is either motor 36 or 42 should trip, or if dead man switch 50 should become open, or if the contacts within accelerator 48 change state, relay 178 will cause the system to be deenergized.

The potentiometer 182 has a middle setting, representative of zero speed. If the accelerator lever is moved to one side of that zero position, the vehicle accelerator in the direction of motion selected by direction switch 176. Movement of the accelerator lever to the other side of the zero speed position causes the motors 36 and 42 to enter the regenerative braking mode of operation. Under that mode of operation, the motors develop torque in a direction opposite to the motor's direction of rotation. In that mode of operation, neither of the motors is drawing power from the supply bus. In fact, the motors are acting as generators which are pumping power into the bu conductors 159 and 160. It is under that condition of operation that the bus loader board 168 monitors the voltage on bus conductors 159 and 160, and shunts the excess voltage into regenerative resistor 172. Because the torque produced by the motors in the regenerative mode is opposite to the motor's direction of rotation, and is not dependent upon the speed of the rotor, regenerative braking can be used to bring the vehicle 10 to a complete stop.

Other benefits of using a brushless D.C. motor are that such motors are rugged and reliable and, because there are no brushes to be changed, require very little maintenance. There is no commutator, which requires servicing, not are there any field windings, which can be burned out. Because the brushless D.C. motor is constantly monitoring the position and speed of the rotor as well as the current drawn by the motor, very precise control of the vehicle is obtainable. The isolation of the control electronics from the driver board and switching module allows the control electronics to produce the needed control signals in an electrically clean and noise-free environment. Those control signals are input to the switching module 116 through the driver board 112 so that current can be smoothly applied to the motors. In that manner, solid state electronic circuitry is used within an environment which is typically not conducive to such circuitry.

While the present invention has been described in conjunction with a preferred embodiment thereof, those of ordinary skill in the art will recognize that other modifications and variations are possible. The foregoing description and the following claims are intended to cover all such modifications and variations.

What we claim is:

1. A mining vehicle for use on a high voltage, D.C. trolley system of the type having an overhead high voltage conductor and a pair of parallel rails at ground potential, said mining vehicle comprising:
   a vehicle frame;
   a plurality of flanged wheels positioned under said frame and connected thereto so as to support the weight of said vehicle, said wheels adapted to ride along the parallel rails of the trolley system, said vehicle frame carrying the following;
   a brushless D.C. motor having a rotor and a stator, said rotor carrying means for generating a field flux and said stator having a plurality of winding portions each portion capable of generating magnetic flux;
   means for mechanically coupling the rotary motion of said rotor to said plurality of wheels;
   a high voltage bus;
   connection means for contacting the high voltage conductor of the trolley system and for connecting the high voltage conductor to said high voltage bus;
   a switching network connected between said high voltage bus and said portions of said stator winding for delivering current to said portions of said stator winding;
   first transducer means for producing a first group of feedback signals representative of the position and speed of said rotor;
   second transducer means for producing a second group of feedback signal representative of the current delivered to said motor;
   means for producing an input signal representative of the desired speed of the vehicle;
   circuit means responsive to said input signal, said first group of feedback signals, and said second group of feedback signals, for producing control signals, said control signals for input to said switching network to control the application of current to said portions of said stator winding, said control signals causing the vehicle to travel at the desired speed and causing said motor to produce constant torque;
   capacitor means connected to said high voltage bus;
   first resistor means connected between said capacitor means and ground potential for discharging said capacitor means when said connection means loses contact with the high voltage conductor;
   second resistor means;
   detector means connected to said high voltage bus for connecting said bus to said second resistor means in the event of an over-voltage condition on said bus; and
   brakes for acting upon said flanged wheels for bringing said vehicle to a stop when desired.

2. The mining vehicle of claim 1 additionally comprising:
   a second brushless D.C. motor having a rotor and a stator, said rotor carrying means for generating a field flux and said stator having a plurality of winding portions each portion capable of generating magnetic flux;
   second means for mechanically coupling the rotary motion of said rotor to said plurality of wheels;
   a second switching network connected between said high voltage bus and said portions of said stator winding for delivering current to said portions of said stator winding;
   third transducer means for producing a third group of feedback signals representative of the position and speed of said rotor;
   fourth transducer means for producing a fourth group of feedback signal representative of the current delivered to said second motor; and
   second circuit means responsive to said first circuit means, said third group of feedback signals, and said fourth group of feedback signals, for producing control signals, said control signals for input to said second switching network to control the application of current to said portions of said stator winding, said control signals causing the vehicle to travel at the desired speed and causing said second motor to produce constant torque.

3. The mining vehicle of claim 1 wherein said connection means includes a trolley pole having a shoe for slidably engaging the high voltage conductor of the trolley system, and a conductor carried by said trolley pole for connecting said shoe to said high voltage bus.

4. The mining vehicle of claim 3 additionally comprising a circuit break connected between said shoe and said high voltage bus along said conductor.

5. The mining vehicle of claim 3 additionally comprising a diode connected between said shoe and said high voltage bus along said conductor, and wherein said first resistor means is connected between said shoe and said diode and ground.

* * * * *

UNITED STATES PATENT AND TRADEMARK OFFICE
CERTIFICATE OF CORRECTION

PATENT NO. : 5,221,880
DATED : June 22, 1993
INVENTOR(S) : Jess Bartholow and Michael L. Bartholow It is certified that error appears in the above-identified patent and that said Letters Patent is hereby corrected as shown below:

Col. 2, line 31, after "meter" add --.--.

Col. 2, line 58, after "to" add --support the weight of the vehicle. The wheels are adapted to--.

Col. 4, line 20, after "trolley", add --vehicle 10, commonly referred to as a Jeep. Although the --.

Col. 9, line 38, delete "or" and substitute therefor --of--.

Col. 9, line 55 and 56, after "11." delete "Upper terminal 10 is connected to lower terminal A." and substitute there for --Upper terminal 8 is connected to middle terminal 10.--

Col. 10, line 14, delete "148" and substitute therefor --178--.

Col. 10, line 19, delete "associated" and substitute therefor --connected--.

Col. 11, line 10, delete "accelerator" and substitute therefor --accelerates--.

Col. 11, line 20, delete "bu" and substitute therefor --bus--.

Col. 11, line 34, delete "not" and substitute therefor --nor--.

Signed and Sealed this

Nineteenth Day of April, 1994

Attest:

BRUCE LEHMAN

Attesting Officer     Commissioner of Patents and Trademarks